(12) United States Patent
Axelrod et al.

(10) Patent No.: US 8,548,449 B2
(45) Date of Patent: Oct. 1, 2013

(54) MOBILE CONTACT NOTES

(75) Inventors: Elinor Axelrod, Redmond, WA (US); Dror Zelber, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 596 days.

(21) Appl. No.: 12/784,246

(22) Filed: May 20, 2010

(65) Prior Publication Data

US 2011/0287810 A1   Nov. 24, 2011

(51) Int. Cl.
*H04M 3/42* (2006.01)
(52) U.S. Cl.
USPC ............................ 455/415; 455/417; 455/566
(58) Field of Classification Search
USPC ........ 455/566, 567, 556.2, 158.5, 414.1–417, 455/550.1, 425, 407, 412.2, 432.2
See application file for complete search history.

(56) References Cited

U.S. PATENT DOCUMENTS

| | | | |
|---|---|---|---|
| 5,915,003 A * | 6/1999 | Bremer et al. | 379/93.19 |
| 6,112,182 A * | 8/2000 | Akers et al. | 705/2 |
| 6,321,078 B1 * | 11/2001 | Menelli et al. | 455/407 |
| 6,950,648 B2 * | 9/2005 | Pappalardo et al. | 455/412.1 |
| 7,139,555 B2 | 11/2006 | Apfel | |
| 7,197,544 B2 * | 3/2007 | Wang et al. | 709/219 |
| 7,430,719 B2 | 9/2008 | Pettinati et al. | |
| 7,493,567 B2 | 2/2009 | Ollis et al. | |
| 7,653,181 B2 | 1/2010 | Beasley et al. | |
| RE42,285 E * | 4/2011 | Anderson et al. | 342/457 |
| 8,085,922 B1 * | 12/2011 | Smith et al. | 379/216.01 |
| 8,095,551 B2 * | 1/2012 | Kountz et al. | 707/758 |
| 8,230,265 B2 * | 7/2012 | Rajashekara et al. | 714/38.1 |
| 2002/0119768 A1 * | 8/2002 | Matsumoto et al. | 455/412 |
| 2003/0148753 A1 * | 8/2003 | Pappalardo et al. | 455/405 |
| 2004/0214610 A1 * | 10/2004 | Tanemura et al. | 455/566 |
| 2005/0091314 A1 | 4/2005 | Blagsvedt et al. | |
| 2005/0288005 A1 * | 12/2005 | Roth et al. | 455/418 |
| 2006/0195474 A1 | 8/2006 | Cadiz et al. | |

(Continued)

FOREIGN PATENT DOCUMENTS

| | | |
|---|---|---|
| CN | 101513023 A | 8/2009 |
| WO | WO2008/026024 A1 | 3/2008 |

OTHER PUBLICATIONS

Bohn, Dieter, "Microsoft Recite: Voice Notes for your Windows Mobile Phone," WM Experts, [http://www.wmexperts.com/microsoft-recite-voice-notes-your-windows-mobile-phone], Feb. 15, 2009, 3 pages.

(Continued)

*Primary Examiner* — Dominic E Rego
(74) *Attorney, Agent, or Firm* — Vierra Magen Marcus LLP (57) ABSTRACT

Systems and methods for managing contact information on mobile devices is provided. When a telephone call is initiated or received, a contact record associated with the call is accessed to determine if it includes notes to be displayed during the call. If there are notes to be displayed, they are displayed for the user during the call. Notes may include display tags indicating they should be displayed as well as action tags specifying actions to take for calls with the contact. An option to dismiss the note(s) can be provided, as well as an option to edit the note. When calls complete, the system provides options to the user to create and save a new note for the contact record. In some embodiments, the system provides options for the user to record audio from telephone conversations. The recording is translated to text and optionally stored in a contact record.

17 Claims, 9 Drawing Sheets

(56) References Cited

U.S. PATENT DOCUMENTS

| | | |
|---|---|---|
| 2006/0229063 A1 | 10/2006 | Koch |
| 2007/0008987 A1 | 1/2007 | Manion et al. |
| 2007/0010264 A1 | 1/2007 | Sun et al. |
| 2007/0030824 A1* | 2/2007 | Ribaudo et al. ............... 370/328 |
| 2007/0041550 A1* | 2/2007 | McLarty et al. ......... 379/211.02 |
| 2007/0043688 A1 | 2/2007 | Kountz et al. |
| 2007/0106931 A1* | 5/2007 | Vartiainen et al. ............ 715/512 |
| 2007/0123230 A1* | 5/2007 | Matsumoto et al. ....... 455/414.1 |
| 2007/0214292 A1* | 9/2007 | Hayes et al. ..................... 710/52 |
| 2007/0239685 A1 | 10/2007 | Howell et al. |
| 2007/0245229 A1 | 10/2007 | Siedzik et al. |
| 2007/0262964 A1 | 11/2007 | Zotov et al. |
| 2007/0274293 A1 | 11/2007 | Forbes |
| 2008/0115087 A1 | 5/2008 | Rollin et al. |
| 2008/0250066 A1* | 10/2008 | Ekstrand et al. ........... 707/104.1 |
| 2008/0253537 A1 | 10/2008 | Johnston et al. |
| 2008/0316888 A1 | 12/2008 | Reifman |
| 2009/0094283 A1 | 4/2009 | Baudisch et al. |
| 2009/0111437 A1 | 4/2009 | Elman et al. |
| 2009/0220067 A1* | 9/2009 | Leeds ...................... 379/207.16 |
| 2009/0265330 A1* | 10/2009 | Cheng et al. ....................... 707/5 |
| 2009/0280786 A1 | 11/2009 | Ziklik |
| 2009/0299743 A1 | 12/2009 | Rogers |
| 2010/0062753 A1 | 3/2010 | Wen et al. |
| 2010/0161683 A1* | 6/2010 | Leeds et al. ................... 707/803 |
| 2010/0317332 A1* | 12/2010 | Bathiche et al. .............. 455/418 |
| 2011/0026898 A1* | 2/2011 | Lussier et al. ................ 386/280 |
| 2011/0159854 A1* | 6/2011 | Kedefors et al. ........... 455/414.1 |

OTHER PUBLICATIONS

Whittaker, S., et al., "Managing long term communications: Conversation and Contact Management," Proceedings of the 3th Hawaii International Conference on System Sciences, IEEE, Jan. 2002, 10 pages.

Hindus, D., et al., "Capturing, Structuring, and Representing Ubiquitous Audio," ACM Transactions on Information Systems, vol. 11, No. 4, Oct. 1993, pp. 376-400.

Chinese Office Action dated Aug. 2, 2012, Chinese Patent Application No. 20110143844.8.

English Abstract of Chinese Publication No. CN101513023 published Aug. 19, 2009.

Response to Office Action dated Nov. 30, 2012, Chinese Patent Application No. 201110143844.8.

English translation of the amended claims filed in response to Office Action dated Nov. 30, 2012, Chinese Patent Application No. 201110143844.8.

Second Office Action dated Feb. 8, 2013, Chinese Patent Application No. 2011101143844.8.

\* cited by examiner

MOBILE CONTACT NOTES

BACKGROUND

Mobile devices including portable telephone systems, such as cellular phones, have been steadily increasing the type and variety of content that they provide to a user. Many mobile devices incorporate sufficient computing capabilities to fall within the category of the small, handheld computing devices. Mobile devices may be known by other names rather than cellular phones and generally refer to devices that have been integrated with receiver/transmitter technology so that they can send and receive telephone calls or other messages via a network. Mobile devices include palmtops, pocket computers, personal digital assistants, personal organizers, personal computers (PCs), and the like.

Many mobile devices provide contact management systems that allow users to store and access contact information for their contacts. Contact records typically include name, phone, internet, email, and physical address information as well as notes the user has added for the contact. In some instances, mobile devices may provide a caller identification feature where an incoming caller is identified by phone number and/or a short name which may be retrieved by matching the calling number with contact information stored in the mobile device or elsewhere.

SUMMARY

Systems and associated methods for managing and displaying contact information for mobile devices are provided. Contact records stored locally on the mobile device or elsewhere are modified to include display and/or action identifiers. A display identifier, which is a tag in one embodiment, identifies information in a contact record that is to be displayed during an incoming call from a known contact or during an outgoing call to a known contact. An action identifier, which can also be a tag, identifies an action to be performed when a call with a known contact is received or initiated.

In one embodiment, the device displays options for the user to create a new note or edit an existing note at the end of and/or during a telephone conversation. The options may include options to have the note displayed during subsequent telephone calls with the contact. The options may further include options to add actions to be performed during subsequent telephone calls with the contact. If the user saves a note with a display or action tag, the note will be displayed and/or cause the mobile device to perform an associated action during a subsequent call with the contact. When a call is initiated to or received from an unknown contact, the system can provide the user the option to create a new contact and save notes to this new contact. The options can be provided during and/or at the end of the telephone call.

In one embodiment, the system determines if an outgoing or incoming call is associated with a known contact. If the contact is known, the system determines whether the contact record includes one or more notes to be displayed during a call with the contact. If there are notes indicating they should be displayed during a call, they are displayed for the user during the call. An option to dismiss the note(s) can be provided, as well as options to edit the existing note, add a new note, save the note(s), or perform combinations of these options.

In one embodiment, the system provides an option to a user of a mobile device to record audio when initiating or receiving calls with a caller. One or more segments of recorded audio are translated into text, and displayed at the end of the conversation with the caller. In one example, the translated text is displayed on the device for the user with the ability to edit, modify, delete or save as a note in a contact record for the caller. If a contact record exists on the mobile device for the caller, the note can be automatically saved after being translated and/or modified. If a contact record for the caller does not exist, an option to create a new contact record can be provided. The translated text can be displayed on the mobile device during later calls with the contact.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments in accordance with the disclosed technology include systems and methods for managing contact information. In one embodiment, when initiating or receiving a call, the system determines if the call is associated with a known contact. If the contact is known, the system determines whether the contact record includes one or more notes to be displayed during a call with the contact. If there are notes indicating they should be displayed during a call, they are displayed for the user during the call. An option to dismiss the note(s) can be provided, as well as an option to edit the existing note, add a new note, save the note(s), etc. In one embodiment, after a user completes a call, the system displays options for the user to add, edit and/or save notes to the contact record for the contact.

Further embodiments provide an option to a user of a mobile device to record audio when initiating or receiving calls with a caller. One or more segments of recorded audio are translated into text, and displayed at the end of the conversation with the caller. In one example, the translated text is displayed on the device for the user with the ability to edit, modify, delete or save as a note in a contact record for the caller. If a contact record exists on the mobile device for the caller, the note can be automatically saved after being translated and/or modified. If a contact record for the caller does not exist, an option to create a new contact record can be provided. The translated text can be displayed on the mobile device during later calls with the contact.

Figure 1:
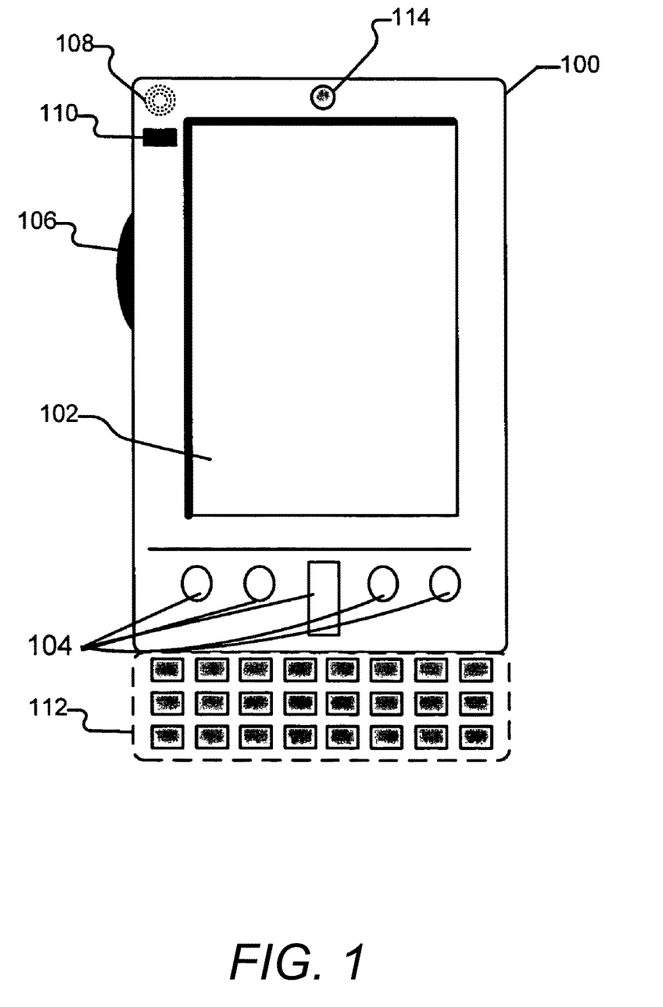
FIG. 1 is a block diagram of an example of a mobile device.

FIG. 1 depicts an example of a mobile device 100 for implementing embodiments of the disclosed technology. In this basic example, the mobile computing device 100 may be a cell phone, personal digital assistant, handheld computer, etc. The device includes touch screen display 102 and input buttons 104 to allow the user to enter information into mobile computing device 100. Mobile device 100 also incorporates a side input element 106 allowing further user input. Side input element 106 may be a rotary switch, a button, or any other type of manual input element. In alternative embodiments, mobile computing device 100 may incorporate more or less than the input elements depicted. For example, display 102 may not be a touch screen in some embodiments. In yet another embodiment, the mobile computing device is a portable phone system, such as a cellular phone having display 102 and input buttons 104. Mobile computing device 100 may also include an optional keypad 112. Optional keypad 112 may be a physical keypad or a "soft" keypad generated on the touch screen display. Yet another input device that may be integrated to mobile computing device 100 is on-board camera 114.

Mobile device 100 incorporates output elements, such as display 102, which can display a graphical user interface (GUI). Other output elements include speaker 108 and LED light 110. Additionally, mobile computing device 100 may incorporate a vibration module (not shown), which causes mobile computing device 100 to vibrate to notify the user of an event. In yet another embodiment, mobile computing device 100 may incorporate a headphone jack (not shown) for providing another means of providing output signals.

Although described herein in combination with mobile device 100, alternative embodiments can be used with any number of computer systems, such as desktop computers, other hand-held devices, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment, with programs located in both local and remote memory storage devices.

Figure 2:
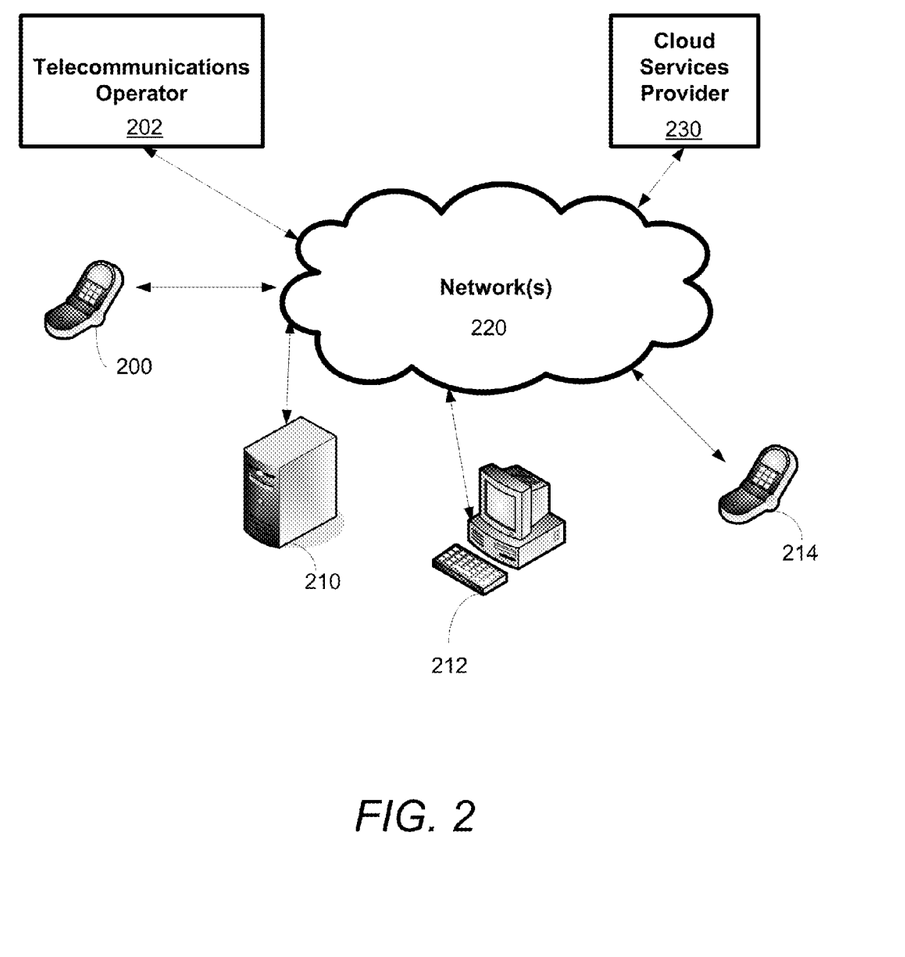
FIG. 2 is a block diagram of a networked computing environment in which embodiments may be practiced.

FIG. 2 depicts a telecommunication system in which one or more embodiments of the disclosed technology may be implemented. Mobile computing device 200 may operate in a networked environment to transmit to and receive data from other computing devices such as server 210, desktop computer 212, and mobile device 214. Other computing devices may participate in this networked system as well. The computing devices participating in the networked environment may communicate over one or more network(s) 220. The network(s) 220 may include a secure network such as an enterprise network, or an unsecure network such as a wireless open network. By way of example and not limitation, the network(s) may include local area networks (LANs), wide area networks (WAN), the Internet, wired transmission media such as a wired network or direct-wired connection, and wireless transmission media such as acoustic, RF, infrared and other wireless media.

A telecommunications operator 202 is depicted which may provide services to both fixed and mobile devices. Operator systems such as 202 can provide access to networks 220 through operator mobile and IP networks, for example. Such systems may include an interface network (IN) server, an OMA server, and a cloud server such as a WINDOWS LIVE (WL) server. A cloud service provider 230 is depicted, which may provide functions such as audio to text translation as described hereinafter, without providing basic telecommunication services as described above.

The operator and service providers can utilize existing mobile core network and back office systems to lay the foundation for next generation Internet protocol multimedia subsystems (IMS) architectures, etc. A service provider system is typically installed as part of a telecommunication operator's core network and operates with various components in the carrier network. Telecommunications operator 204 and cloud services provider 230 may support different application interfaces allowing networked communications within telecommunication operator's various networks. The telecommunication operator networks include, but are not limited to, a 3G/GSM network, internet protocol network and a cloud services layer, etc. Users may communicate with each other in many ways, such as, but not limited to, through an operator's 3G network (by initiating or receiving a call on mobile devices 200, 216, for example), through an operator's IP network (by initiating/receiving a call on mobile device 300 or personal computer 212).

Figure 3:
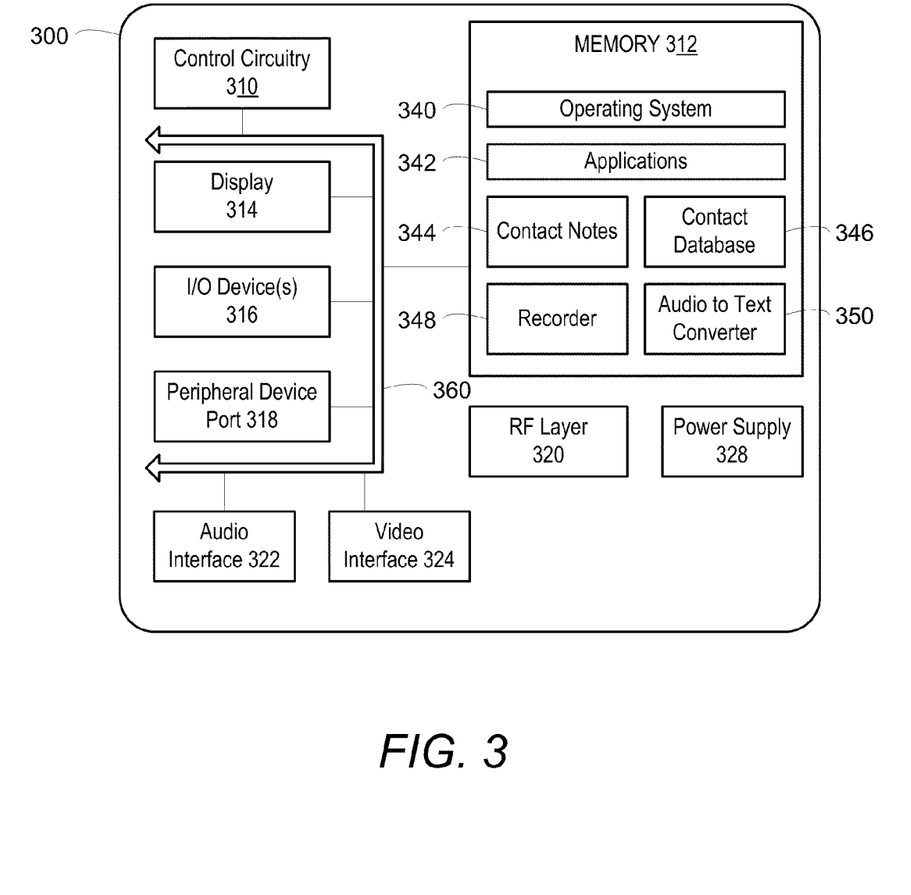
FIG. 3 is a block diagram of one example of a mobile device that can be used to implement embodiments of the disclosed technology.

FIG. 3 is a block diagram of one example of a mobile device 300 that can be used to implement embodiments of the disclosed technology. Exemplary electronic circuitry of a typical cell phone is depicted with a contact notes system for intelligently managing, recording, and displaying contact information during telephone calls. Mobile device 300 can be used in implementing a phone such as a smart phone or other device that can run one or more applications such as, for example, browser, email, scheduling, instant messaging, and media player applications. System 300 can execute an Operating System (OS) 340 such as, WINDOWS XP®, WINDOWS MOBILE 2003®, Microsoft Windows Mobile 6.X, Microsoft Phone 7 Series, or WINDOWS CE® available from MICROSOFT CORPORATION, REDMOND, Wash. In some embodiments, system 300 is integrated as a computing device, such as an integrated personal digital assistant (PDA) and wireless phone. Although specific components and software modules are depicted, it will be apparent that numerous physical and software based configurations may be employed while remaining within the spirit of the present disclosure. Generally, software and program modules as described herein include routines, programs, components, data structures, and other types of structures that perform particular tasks or implement particular abstract data types. Hardware or combinations of hardware and software can be substituted for software modules as described herein.

System 300 includes control circuitry 310, memory 312, display 314 and I/O device(s) 316 connected to one or more data buses 360. A peripheral device port 318 is provided for connecting to various peripherals. The control circuitry 310 includes one or more microprocessors. Memory 312 typically includes both non-volatile memory such as ROM and volatile memory such as RAM. Memory 312 stores processor-readable code which is executed by one or more processors of the control circuitry 310 to implement various functionality described herein. I/O device(s) 316 may include any number of input/output devices, such as a rollerball, push button numeric dialing pad (such as on a typical telephone), multikey keyboard (such as a conventional keyboard). In one example, a separate I/O device may not be included in the mobile computing device such as where a touch screen or stylus is used. Display 314 may be a liquid crystal display, or any other type of display commonly used in mobile computing devices. Display 314 may be touch-sensitive, and would then also act as an input device. Power supply 328, which can include one or more batteries and/or an external power source, powers the various components of the mobile device.

The control circuitry further communicates with audio interface 322 and video interface 324. Audio interface 322 may be used with a speaker to provide audible signals to a user and a microphone to receive audible signals from the user, such as to facilitate a telephone conversation. Video interface 324 enables operation of an on-board camera to record still images, video streams, and the like, and further enables video for display 314.

System 300 includes an operating system 340, which in this embodiment is resident in memory 312 and executes on control circuitry 310. One or more applications 342 are loaded into memory 312 and run on or outside of operating system 340. Examples of application programs include phone dialer programs, e-mail programs, PIM (personal information management) programs, word processing programs, spreadsheet programs, Internet browser programs, and so forth. Applications 342 may use and store information in non-volatile storage, such as e-mail or other messages used by an e-mail application, contact information used by a PIM, documents used by a word processing application, and the like. A synchronization application (not shown) may resides on system 300 and be programmed to interact with a corresponding synchronization application resident on a host computer to keep the information stored in the non-volatile storage synchronized with corresponding information stored at the host computer.

The control circuitry 310 communicates with radio frequency (RF) layer 320 which in turn is coupled to an antenna (not shown) to transmit and receive radio frequency communications. The control circuitry 310 controls transmission and reception of wireless signals. During a transmission mode, the control circuitry 310 provides a voice signal from a microphone, or other data signal, to the transmit/receive circuitry of the RF layer 320. The transmit/receive circuitry transmits the signal to a remote station (e.g., a fixed station, operator, other cellular phones, etc.) for communication through the antenna. Ringers, vibrators (not shown) and the like can be used to signal an incoming call, text message, calendar reminder, alarm clock reminder, or other notification to the user. Transmissions to and from the RF layer 320 can be conducted under control of the operating system 340. Communications received by the RF layer may be disseminated to applications 342 via the operating system 340, and vice versa. During a receiving mode, the transmit/receive circuitry receives a voice or other data signal from a remote station through the antenna. A received voice signal is provided to the speaker while other received data signals are also processed appropriately.

Contact notes module 344 manages the storage and display of contact notes information for mobile device 300. In one embodiment, the contact notes module 344 communicates with a contact database 346 that stores contact records. Although described as a local contact database, the contacts may be stored using alternative techniques such as in a flat file, etc. Moreover, the contacts may be stored remotely from mobile device 300 and/or be part of a unified contact list maintained across multiple locations and/or devices, such as described in U.S. patent application Ser. No. 12/118,311, entitled "Updating Contact Information for Mobile Traffic," filed May 9, 2008, incorporated by reference herein in its entirety. The contact notes module can respond to calls to and from the mobile device 300 by displaying options to a user to edit and add notes to contact records associated with the calls. For example, the contact notes module may provide an option to a user to edit or create a new note when a call is terminated. The contact notes module can further provide options to access, view and edit the contact notes at anytime, for example when the user is offline. This can facilitate the user quickly recording relevant information from the conversation while such information is fresh on the user's mind. The contact notes module allows the user to indicate that certain notes should be displayed during subsequent calls associated with the contact record. The contact notes module also allows the user to indicate actions that should be performed during subsequent calls associated with the contact record.

The contact notes module can further work with the contact database to display notes in contact records during calls associated with a particular contact record. Notes in a contact record containing a display tag, for example, can be accessed and provided on the mobile device display during all or a portion of a telephone call. The contact notes are stored with the contact records and can be accessed for viewing and editing at anytime.

The contact notes module 344 also provides capabilities for a user to record all or portions of conversations during telephone calls. Options to record audio from a telephone call can be provided. Recorder 348 can record one or more segments of audio which are provided to audio to text converter 350. Converter 350 can convert the audio to text and provide the translated text to the contact notes module. The contact notes module allows the user to save the translated text to a contact record associated with the telephone call and/or to edit the translated text. Identifiers indicating that the translated text should be displayed can be inserted to cause the text to be displayed during subsequent phone calls. As described below, other embodiments do not include an audio to text converter, instead utilizing third-party services to perform the audio to text translation. For example, cloud computing services can be employed to offload the translation from the mobile device to a third-party device.

A mobile computing device implementing system 300 may have additional features or functionality. For example, the device may also include additional data storage devices (removable and/or non-removable) such as, magnetic disks, optical disks, or tape.

Figure 4:
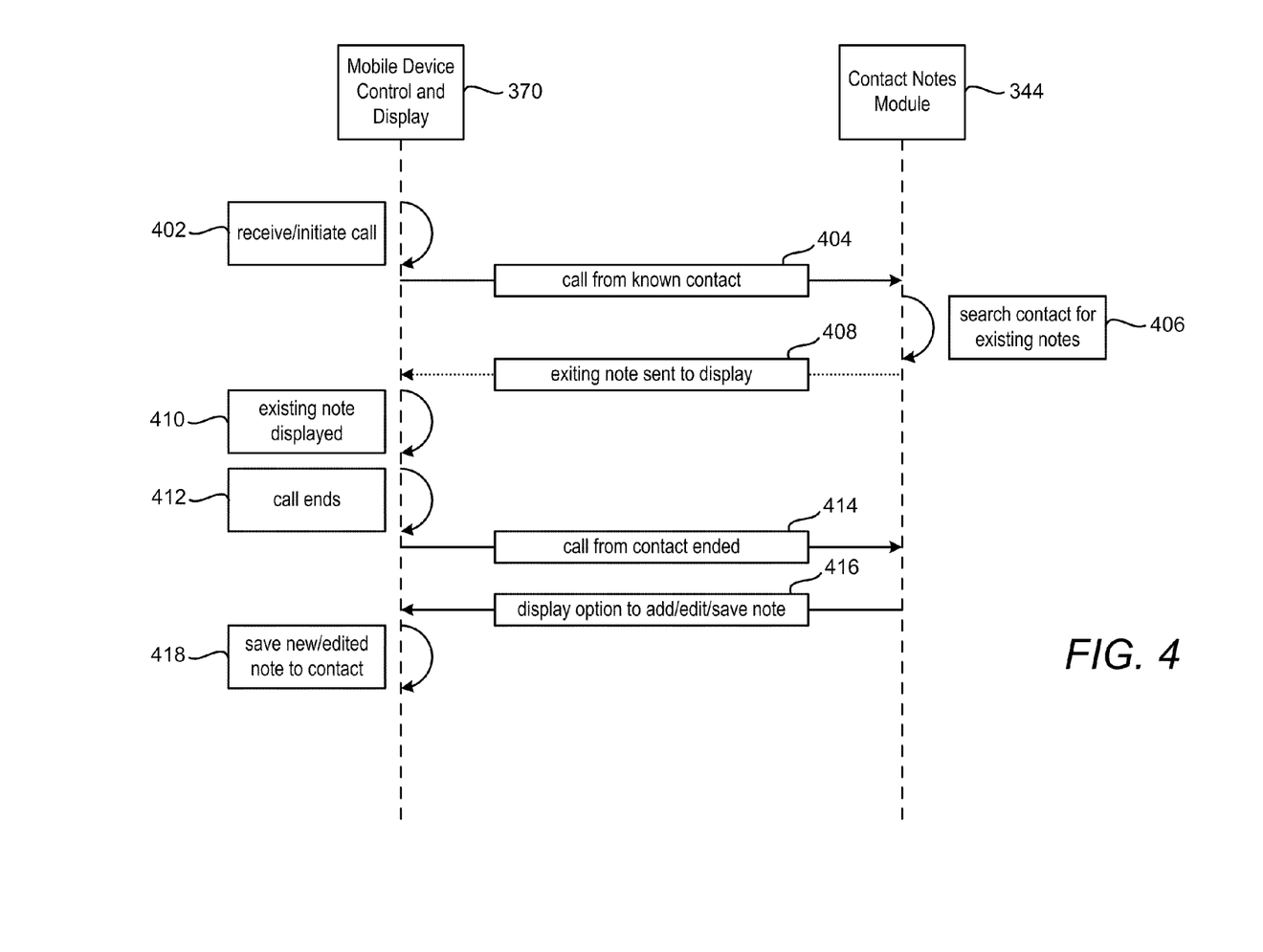
FIG. 4 is a diagram depicting a sequence of events and processing by a mobile device in accordance with one embodiment.

FIG. 4 is a diagram showing a sequence of events and processing by a mobile computing device to intelligently manage and display contact information during a telephone call. FIG. 4 depicts communication and processing between the contact notes module 344 and various control and display components (e.g., components 310, 314, 316, 322, 324) generically labeled mobile device control and display 370 in FIG. 4.

The control circuitry receives or initiates a call at step 402. The contact notes module determines at step 404 that the call is associated with a known contact. The contact notes module may receive an indication from the mobile device control and display that the call is from/to a known contact in one embodiment. In another embodiment, the contact notes module may access a phone number or other piece of identifying information (e.g., email, IM address, etc.) associated with the telephone call, and then search contact database 346 for any contacts having that phone number or other piece of identifying information.

In response to a call with a known contact, the contact notes module searches the contact record associated with the contact at step 406 for any notes that are to be displayed during a telephone call with the contact. In one example, the contact notes module accesses the contact database and searches the notes or body field of the contact record for any notes to be displayed. In one embodiment, notes to be displayed during a telephone call contain a special indicator to distinguish them from other notes that should not be displayed during a telephone conversation. For example, a special character or tag can be applied to particular notes to indicate that those notes are to be displayed during a telephone call with that contact.

If one or more notes are found that are to be displayed, the existing note(s) are sent to the display of the mobile device at step 408. At step 410, the notes are displayed. The notes can be displayed with an option to dismiss them from the display in one embodiment. At step 412, the telephone call ends. The contact notes module determines that the call has ended at step 414, and in response, displays an option at step 416 to edit the note, save the note, and/or add a new note for the contact. The options displayed at step 416 can include an option to remove an existing tag indicating that the note should be displayed. Further, an option to add tags to the note or other notes can be provided to allow the user to designate additional notes for display during a subsequent telephone conversation. When the telephone call is not to or from a known contact, step 416 can include displaying an option to create a new contact and save notes in the new contact record.

Figure 5:
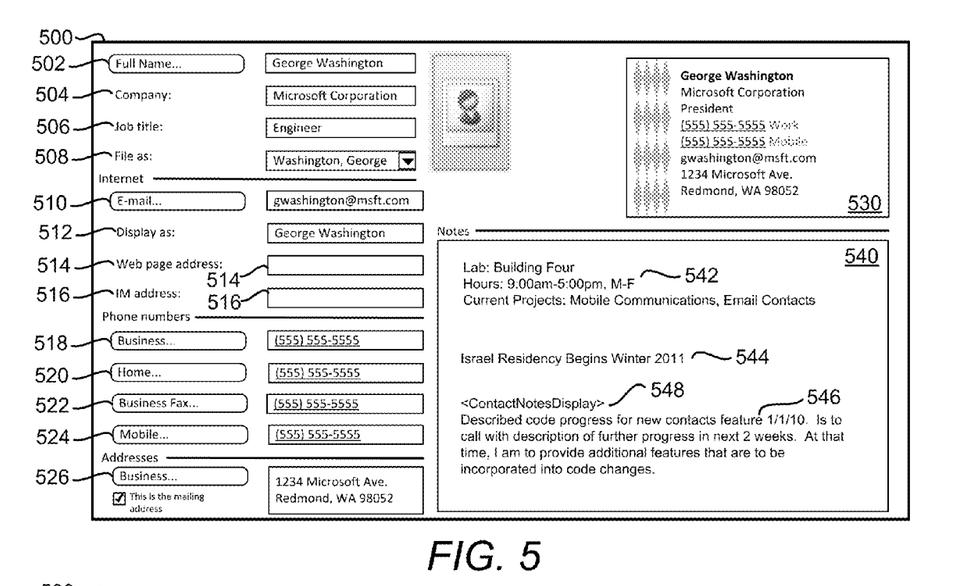
FIG. 5 is a block diagram depicting a graphical user interface of a contact record in accordance with one embodiment.

FIG. 5 is an example of a graphical user interface for a contact record in accordance with one embodiment. Contact record 500 includes traditional contact information in a plurality of fields. For example, fields 502, 504, 506 and 508 respectively set forth the contact's name, company name, job title, and a "file as" preference. Fields 510, 512, 514 and 516 respectively set forth the contact's email address(es), display name, web page address and instant message address. Fields 518, 520, 522 and 524 set forth the contact's phone numbers, such as business, home, business fax and mobile. Field 526 sets forth the contact's physical address(es). A contact card 530 summarizes the contact information.

A notes field 540 provides an area for the user to enter text, audio, video, image or other data for the contact. In this example, the user has entered three notes 542, 544 and 546 for the contact. The first note 542 is text including the "lab," "hours," and "current projects" of the contact. The second note 544 is text including a note about the contacts scheduled move to an Israel residency in Winter 2011. A final note 546 includes a <ContactNotesDisplay> tag 548 before text describing a previous telephone conversation with the contact and some action items the contact and user are to perform. The tag applied to the note is an indication to contact notes module 244 that the text following the tag should be displayed during a telephone conversation with the contact. Accordingly, when a call is initiated to or received from the contact for this contact record, the text following the tag will be displayed on the mobile device's display for the user during the conversation. Notes 542 and 544 which do not contain display tags will be ignored by the contact notes module and will not be displayed during a telephone conversation with the contact. Although a tag is shown in FIG. 4, other examples may include a special character or any other designation for the contact notes module to display the associated text during a telephone call. Opening and closing tags can also be used, for example, to designate notes for display during a telephone call.

Figure 6:
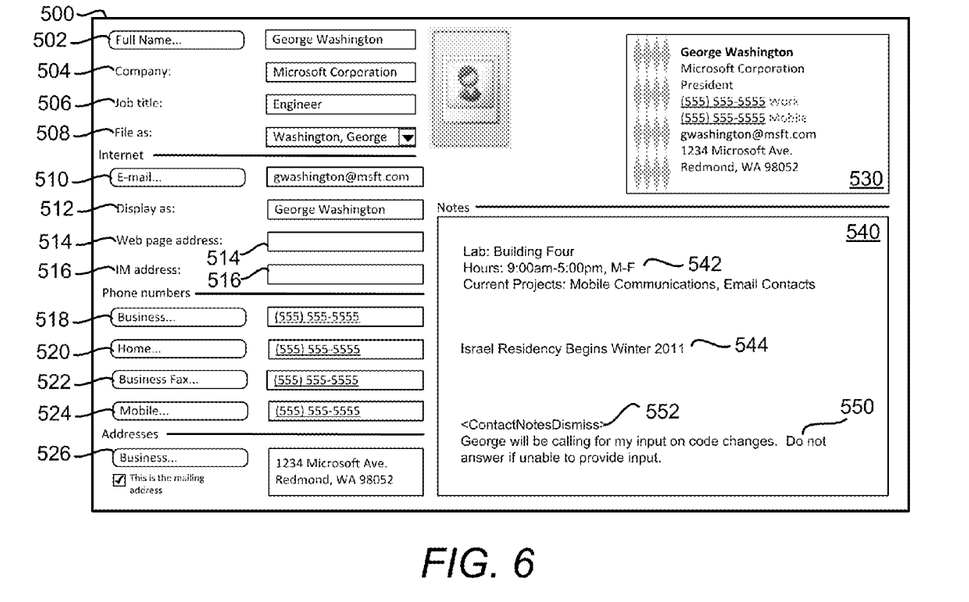
FIG. 6 is a block diagram depicting a graphical user interface of a contact record in accordance with one embodiment.

FIG. 6 is another example of a graphical user interface for a contact record in accordance with an embodiment. In this example, the contact record includes the same fields 502-526 and contact card 530 as in FIG. 5. The notes field 540 also includes notes 542 and 544 as before. In this example, a note 550 has been added with an action <ContactNotesDismiss> tag 552. The <ContactNotesDismiss> tag is an action tag indicating to the contact notes module that the text of the tagged note should be displayed during a telephone call with the contact as with the <ContactNotesDisplay> tag. The tag for note 550, however, further indicates to the contact notes module that an option to dismiss the call and/or note should be provided with a telephone call with the contact is initiated or received. For example, the text following the tag can be displayed with a button to allow the user to dismiss the call. This tag and resulting option to dismiss can alert the user that they did not want to have a telephone call with this contact. The user can select the dismiss option to have the call dismissed. Dismissing a call can include ignoring an incoming call (and also turning off any alert notifications such as a ring or vibration, for example) or terminating an outgoing call.

Figure 7:
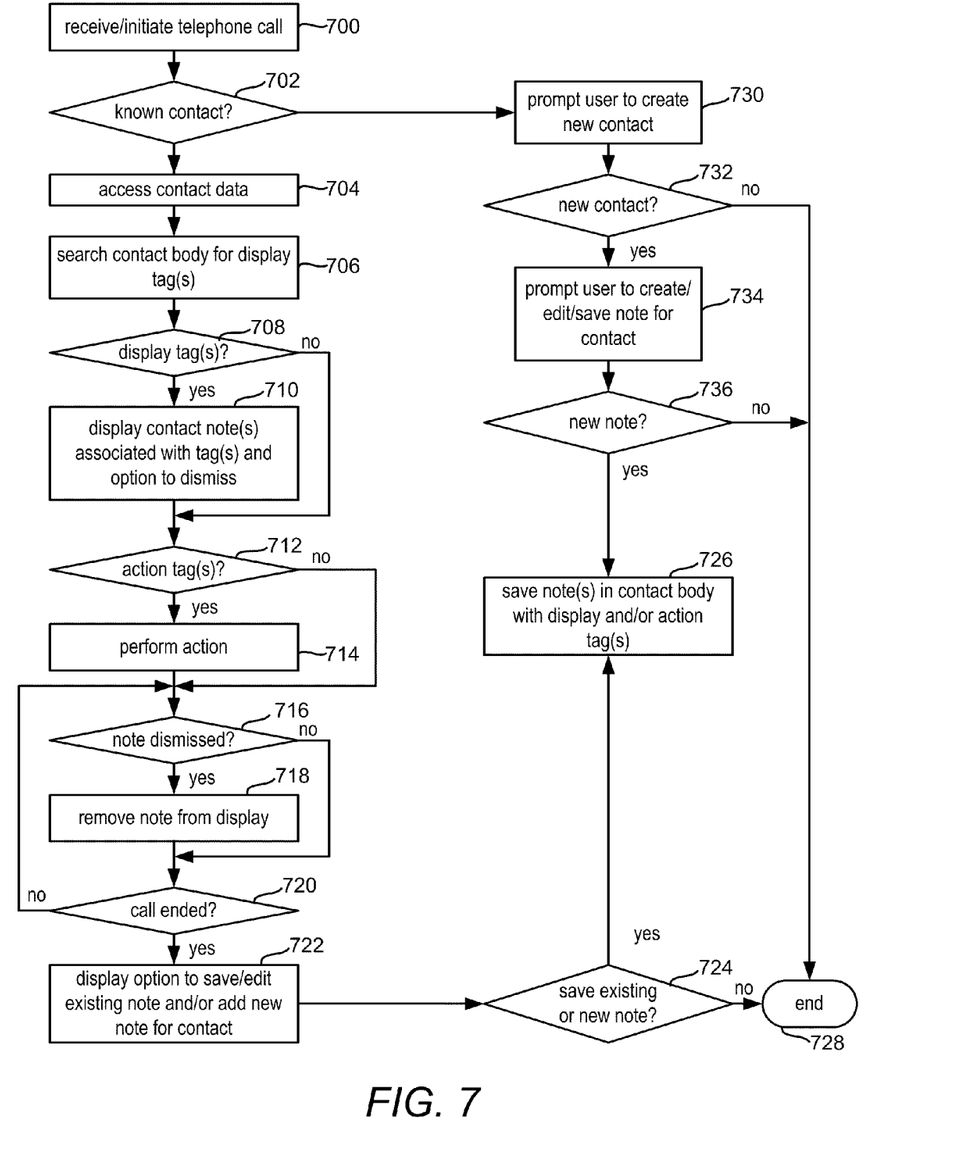
FIG. 7 is a flowchart describing a process of displaying and saving notes for contact records in accordance with one embodiment.

FIG. 7 is a flowchart describing a process for intelligently managing and displaying contact information for a mobile computing device in one embodiment. At step 700, an incoming call to the mobile computing device is received or an outgoing call from the device is initiated. In response to detecting a call, the contact notes module determines if the call is associated with a known contact at step 702. Step 702 can include searching one or more contact databases, etc. to determine if there is a contact record having a phone number matching the phone number of the outgoing or incoming call. Other techniques for locating known contact records can be used. If the contact is known, the contact notes module accesses contact information for the contact at step 704. At step 706, the contact notes module searches the contact information for any display or action tags. In one embodiment, step 706 includes searching a "notes" or "body" field of a contact record for any display or action tags. At step 708, the contact notes module determines if there are any display tags associated with the contact information. If there are, the note(s) associated with the display tag(s) are sent to the display for the mobile device at step 710. In one embodiment, step 710 includes providing an option to save or edit the note as well as an option to dismiss the note to have it removed from the display.

After displaying the notes at step 710 or determining that there are no display tags at step 708, the contact notes module determines if there are any action tags in the contact information at step 712. If there are, the action or actions specified by the tag are performed at step 714. In one example, an action tag specifies that the contact notes module should provide the user with an option to dismiss the call. In another example, an action tag can cause an incoming call to automatically be ignored without alerting the user. In yet another example, an action tag can cause an initiated outgoing call to be paused or interrupted. The system can provide a user with an option to continue the call, thus allowing the outgoing call to proceed, or to cancel the call, thus causing the outgoing call to be terminated without being placed.

After performing an action at step 714 or determining that there are no action tags at step 712, the mobile device determines if the note has been dismissed at step 716. If the user selects an option to dismiss the note, the note is removed from the display at step 718. After removing the note at step 718 or determining that the note is not to be dismissed at step 716, the contact notes module determines if the call has ended at step 720. If the call has not ended, the process continues at step 716. When the call ends as determined at step 720, the contact notes module displays an option at step 722 for the user to save or edit the note(s) displayed at step 710 and/or 714. Step 722 can also display an option to create a new note for the contact. The options to edit a note can include an option to add or remove display and/or action tags for the notes. The contact notes module determines whether the user saves the existing note or a new note at step 724. If the user elects to save the existing note or a new note, the contact notes module saves the note at step 726. If the user has elected to add any display or action tags to the note, these tags are saved with the note at step 726. At step 728, the process completes after saving the note or determining that the note is not to be saved.

Returning to step 702, if the call is not associated with a known contact, the contact notes module prompts the user at step 730 to create a new contact record associated with the call. Step 730 can include providing a pop-up or dialog screen for the user to edit and save a new contact record having the phone number of the call as one piece of contact information. If the user creates a new contact, as determined at step 732, the contact notes module prompts the user at step 734 to create a new note for the contact record. Step 734 can also include providing a pop-up or other dialog screen for the user to create, edit and save a note for the new contact record. If the user elects to create a new contact note, as determined at step 736, the new contact note is saved in the "body" or "notes" field of the contact record at step 726. The new contact record is also saved. If the user elects not to create a new contact at step 732, the process ends at step 728. Likewise, if the user elects not to create a new contact note at step 736, the process ends at step 728. If the user creates a new contact record at step 732 but does not create a new contact note, the new contact record will be saved before the process ends at step 728. Steps 730-736 and 726 can be performed during the telephone call or after the telephone call ends in various embodiments.

Figure 8:
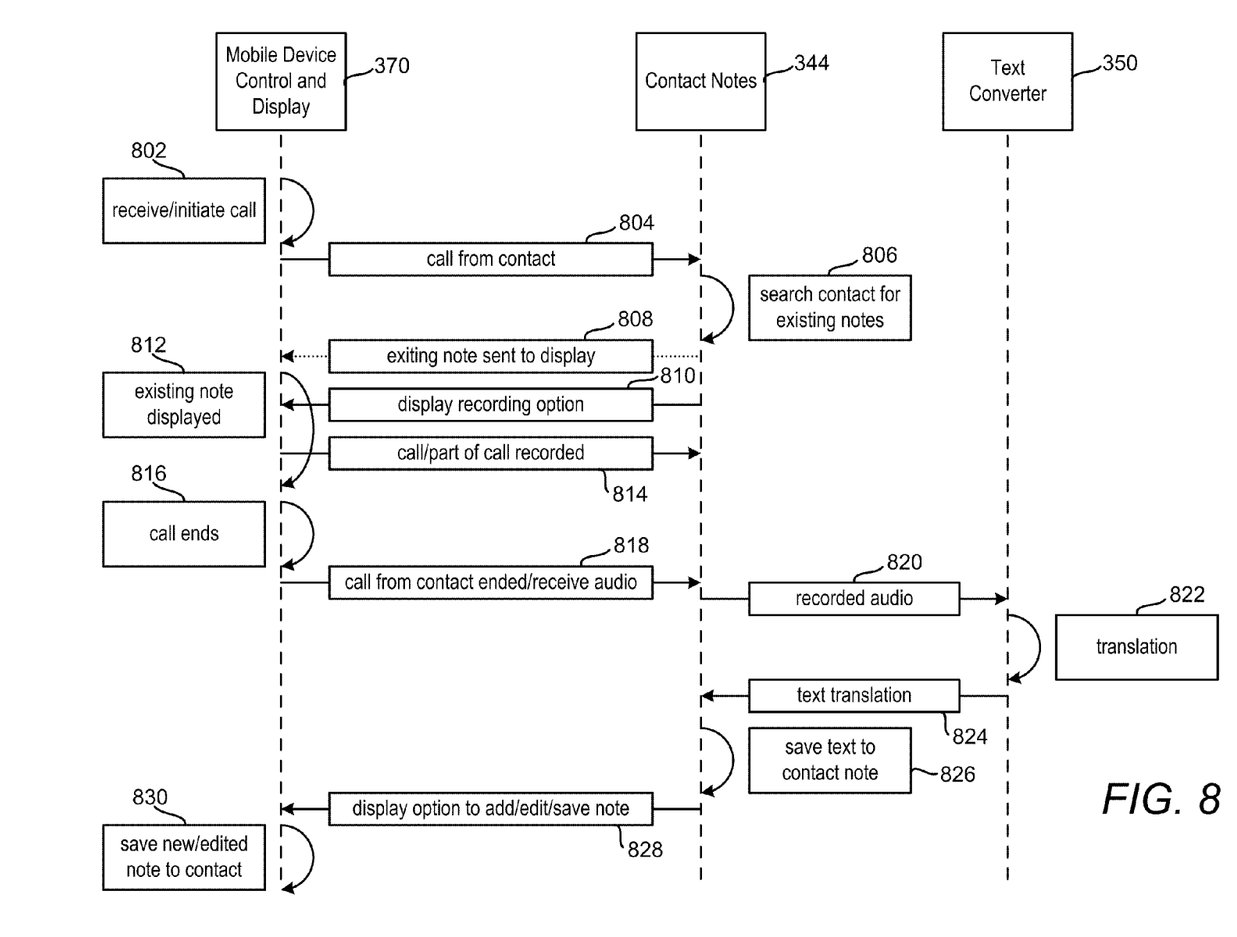
FIG. 8 is a diagram depicting a sequence of events and processing by a mobile device in accordance with one embodiment.

FIG. 8 is a diagram showing a sequence of events and processing by a mobile computing device to record and display contact information during a telephone call. The control circuitry receives or initiates a call at step 802. The contact notes module determines at step 804 that a call has been initiated or received and determines whether the call is associated with a known contact. In response to a call with a known contact, the contact notes module searches the contact record at step 806 for any existing notes that should be displayed during the telephone call or any actions that should be taken. If any notes are to be displayed, they are sent to the mobile device display at step 808. In this embodiment, an option to record the telephone conversation is displayed at step 810. The option to record the telephone conversation can be provided whether or not the telephone call is associated with a known contact. At step 812, any existing notes are displayed on the mobile device. Step 812 can further include performing any actions indicated by the note tags, such as to display an option to dismiss the call, etc.

At step 814, the telephone call or part of the telephone call is recorded in response to input by the user. Step 814 is performed by recorder module 348 in one example, although any suitable technique for audio recording can be used. In one embodiment, the user may select an option displayed at step 810 to record the entire telephone conversation. In another example, the display at step 810 can include options to record and stop recording the conversation at anytime. Accordingly, step 814 may include recording multiple segments of audio from the telephone conversation.

At step 816, the telephone call ends. The contact notes module receives an indication of the end of the call and any segments of audio recorded from the conversation at step 818. In one example, the recorder module 248 compiles multiple segments of audio into a single file at the end of a conversation before transmitting them to the contact notes module. In another example, individual audio segments can be provided to the contact notes module without being combined.

At step 820, the contact notes module sends the recorded audio to audio to text converter 350. The audio to text converter converts the recorded audio to text using known techniques at step 822. The converter can convert individual audio segments into multiple text files or combine multiple audio segments into a single file. At step 824, the translated text from the telephone conversation is provided from the text converter to the contact notes module. The contact notes module saves the translated text to the notes or body field of the contact record at step 826. The contact notes module will add one or more tags or indicators to the translated text note indicating that the note should be displayed during subsequent telephone calls with the contact in one embodiment.

At step 828, the contact notes module displays an option on the mobile device for the user to add a new note and/or edit and save the translated text note. If the telephone call is not associated with a known contact, step 828 can include providing the user with an option to create a new contact record for the contact and to save the translated text note or a new note to that contact record.

At step 830, the mobile device receives input from the user indicating that a new note should be saved or that the translated text note has been edited and/or should be saved. In one embodiment, the translated text is not automatically tagged at step 826 for display. In such an embodiment, the user may edit the translated text note to add tags indicating the text should be displayed at step 830. Further, the user may remove display tags automatically inserted at step 826. The user may further add action tags to the note(s), such as to cause the contact notes module to display a call dismiss button during subsequent calls with the contact.

Figure 9:
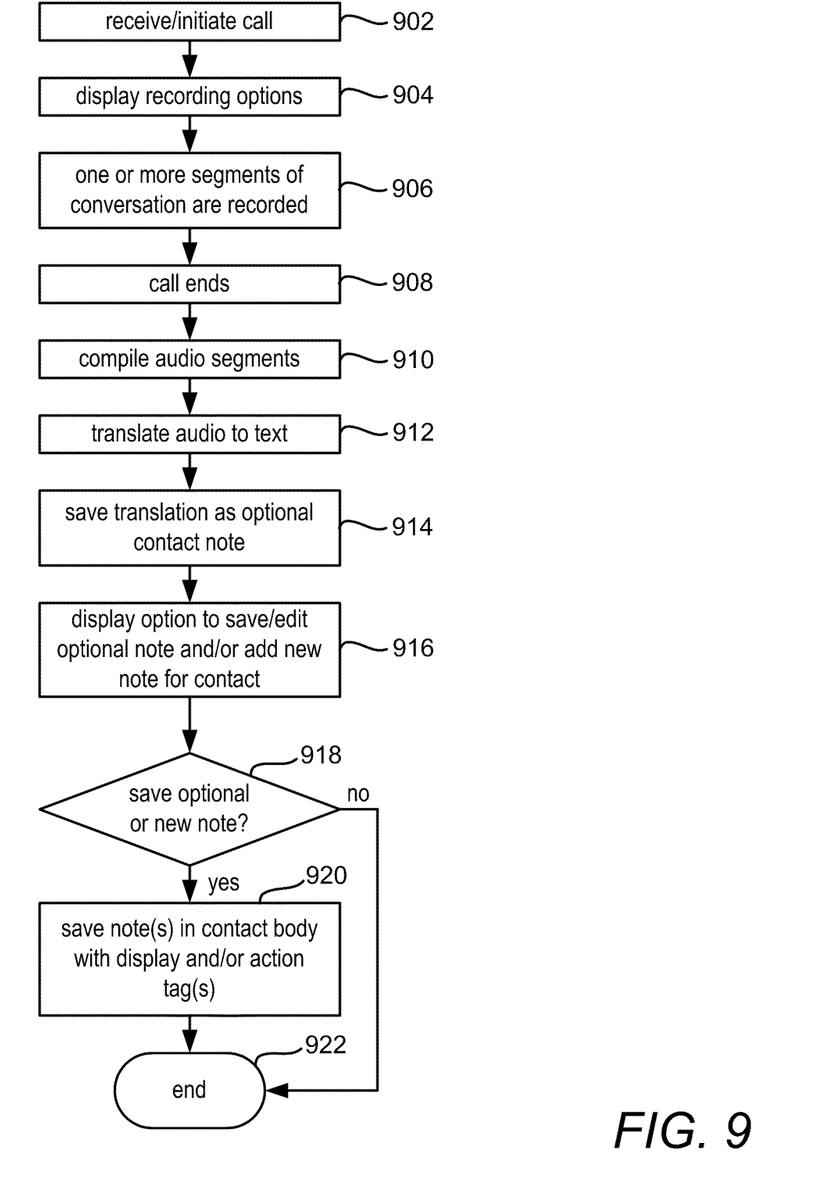
FIG. 9 is a flowchart describing a process of recording audio from a telephone conversation and saving a translated textual version of the conversation in a contact record.

FIG. 9 is flowchart describing a process for recording one or more audio segments of a conversation using a mobile computing device and storing a translated textual version of the one or more segments as notes in a contact record. At step 902, the mobile computing device initiates or receives a telephone call. The telephone call does not need to be associated with an existing or known contact. At step 904, the mobile device displays options for recording the conversation during the telephone call. Step 904 can include providing an on-screen or hard button for recording the entire telephone conversation or providing start and stop recording options to record smaller portions of the entire conversation. Any number of audio segments can be recorded during a telephone conversation at step 906. At step 908, the telephone call ends. At step 910, the mobile device compiles or combines multiple audio segments from the conversation into a single file if multiple audio recordings are made. Step 910 is optional and in some embodiments, the individual audio segments are not combined but are processed individually.

At step 912, the audio file or files are translated into text. Step 912 can include translating the audio file(s) to text at the mobile computing device as described in FIG. 8. In another embodiment, step 912 includes transmitting the audio file(s) to a third-party service remote from the mobile device for the audio to be translated into text. Various third-party service providers may provide computing services including voice to text translation. For example, existing cloud computing services such as cloud services provider 330 in FIG. 2 can be accessed to transmit an audio file and in response, receive a translation of the audio as one or more text files. An internet service provider or mobile telecommunications operator 304 can also provide such translation services.

After translating the audio, the textual translation is saved as an optional contact note in the contact record at step 914.

Step 914 can include inserting one or more display and/or action tags indicating that the translated text should be displayed during subsequent telephone calls with the contact. At step 916, an option for the user to edit and/or save the contact note is provided on the display. The user may edit the text, add additional text or delete text before permanently saving the note to the contact record. The user may also add additional display and/or action tags to the note. Selection buttons can be provided to the user for indicating that a note should be displayed or contain an associated action rather than having the user type the actual tags as shown in FIGS. 6 and 7. An option can also be provided at step 916 for the user to discard the translated text such that it is not saved with the contact record. In one embodiment, if the user does not actively save the translated text as step 916, the optional note will automatically be discarded. Finally, step 916 can include an option for the user to create a new note for the contact record.

At step 918, the system determines whether the user chose to save the optional note or a new note for the contact. If the user indicates that either note should be saved, it is saved in the contact record's note or body field at step 920. Step 920 includes saving any display or action tags with the note so that it will be displayed or cause a corresponding action during subsequent calls with the contact. After saving the note(s) at step 920 or determining that no note is not to be saved at step 918, the process ends at step 922.

Figure 10:
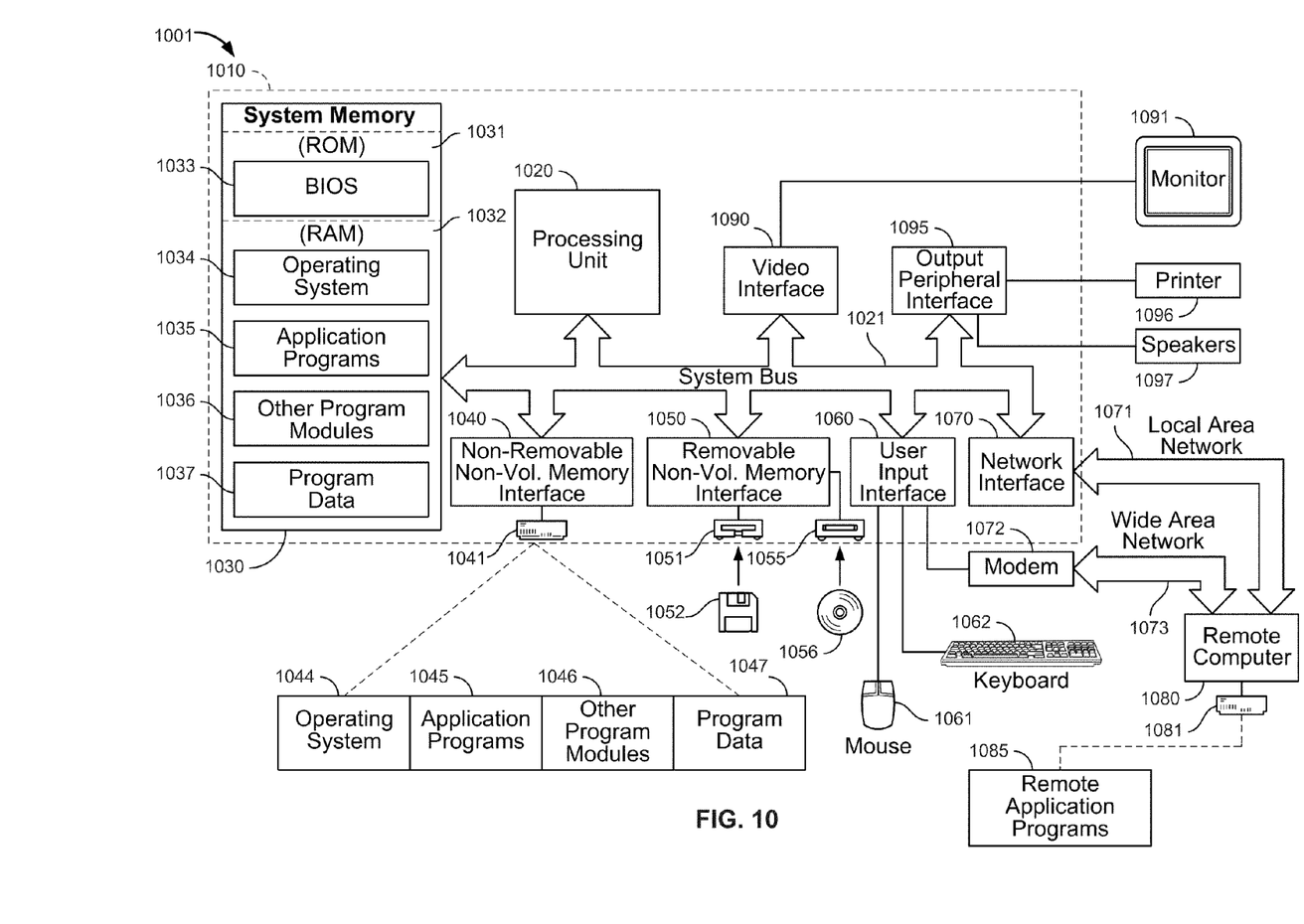
FIG. 10 is a block diagram of a computing system that can be used to implement components and perform methods of the disclosed technology.

With reference to FIG. 10, an exemplary system for implementing the various components of the described system and method may include a general purpose computing device in the form of a computer 1010. Computing device may be used to implement all or a portion of any one of mobile devices 100, 200, 214, 300, computer 212, server 210, communications operator 204, cloud services provider 230, for example. The computing device 1010 is only one example of a suitable computing system and is not intended to suggest any limitation as to the scope of use or functionality of the presently disclosed subject matter. Neither should the computing device be interpreted as having any dependency or requirement relating to any one or combination of components illustrated in the exemplary operating system. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 may include a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The system memory 1030 includes computer storage media in the form of volatile and/or nonvolatile memory such as ROM 1031 and RAM 1032. A basic input/output system (BIOS) 1033, containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disc drive 1041 that reads from or writes to non-removable, nonvolatile magnetic media and a magnetic disc drive 1051 that reads from or writes to a removable, nonvolatile magnetic disc 1052. Computer 1010 may further include an optical media reading device 1055 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 1041 is typically connected to the system bus 1021 through a non-removable memory interface such as interface 1040. Magnetic disc drive 1051 and optical media reading device 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disc drive 1041 is illustrated as storing operating system 1044, application programs 1045, other program modules 1046, and program data 1047. These components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062 and a pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus 1021, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local window network (LAN) 1071 and a wide window network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communication over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communication link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method of displaying contact information for a phone call, comprising:
   receiving or initiating at a first mobile device a telephone call with a second device;
   accessing a contact record at the first mobile device associated with the second device in response to receiving or initiating the telephone call;
   determining if the contact record associated with the second device contains one or more notes for display during the telephone call with the second device, the contact record containing a first note including an identifier that the first note should be displayed during the telephone call with the second device and containing a second note without an identifier; and
   based on the first note including the identifier and the second note not including the identifier, displaying the first note and not displaying the second note on the first mobile device during at least a portion of the telephone call.

2. A method according to claim 1, wherein:
   the contact record associated with the second device includes a body field;
   the first note and the second note are in the body field.

3. A method according to claim 2, wherein:
   the identifier is a display tag; and
   the second note does not include a display tag.

4. A method according to claim 1, wherein the identifier is an action tag, the method further comprising:
   in response to determining that the contact record contains the action tag, providing an option to end the incoming call or outgoing call and to dismiss the first note from the display.

5. A method according to claim 1, wherein the telephone call is a first telephone call, the method further comprising:
   receiving or initiating at the first mobile device a second telephone call with a third device;
   determining that the first mobile device does not contain a contact record associated with the third device;
   providing an option at the first mobile device to create a new contact record associated with the third device in response to determining that the first mobile device does not contain a contact record associated with the third device;
   if a new contact is created, providing an option at the first mobile device to create a new note for the new contact record;
   receiving or initiating at the first mobile device a third telephone call with the third device; and
   displaying the new note in response to the third telephone call.

6. A method according to claim 1, further comprising:
   displaying an option to edit or save the first note when the incoming or outgoing call is completed.

7. A method according to claim 6, further comprising:
   displaying an option to add a new note to the contact record when the incoming call or outgoing call is completed; and
   displaying an option to select the new note for display during subsequent calls associated with the contact record.

8. A method according to claim 7, further comprising:
adding a tag to the new note in response to receiving a user selection of the option to select the new note for display during subsequent calls.

9. A method according to claim 1, further comprising:
in response to receiving or initiating the telephone call, displaying an option to record audio from the telephone call;
recording one or more segments of audio from the telephone call;
translating the one or more segments of audio to text; and
storing the text at the first mobile device as a third note in the contact record associated with the second device.

10. A method according to claim 1, wherein:
the contact record associated with the second device is a contact record for a first person; and
the contact record includes a telephone number corresponding to a telephone number of the telephone call.

11. A mobile device, comprising:
one or more processors;
a network interface for exchanging information over one or more networks; and
one or more storage devices in communication with the network interface and the one or more processors, the one or more storage devices store processor readable code, the one or more processors execute the processor readable code to receive or initiate a telephone call with a second device through the network interface, the one or more processors provide a user option at the mobile device to record audio from the telephone call and in response to selection of the user option, record one or more segments of audio from the telephone call, the one or more processors receive a translation of the one or more segments of audio to text and store the text in a contact record associated with the second device;
wherein the one or more processors add a display tag to the text stored in the contact record associated with the second device and store the text with the display tag in a body field of the contact record; and
wherein the one or more processors access the contact record associated with the second device in response to an additional call with the second device and determine whether the contact record contains a note having the display tag and display the note at the first mobile device in response to the display tag, the note including the text of the one or more segments of audio.

12. A mobile device according to claim 11, wherein:
the one or more segments of audio include at least two segments of audio;
the one or more processors combine the at least two segments of audio, provide the at least two segments of audio to a third-party service provider using the network interface and receive from the third-party service provider the text of the at least two segments of audio.

13. A mobile device according to claim 11, wherein the one or more processors translate the at least two segments of audio to text at the mobile device.

14. One or more processor readable storage devices having processor readable code embodied on the one or more processor readable storage devices, the processor readable code for programming one or more processors to perform a method comprising:
receiving or initiating at a first mobile device a telephone call with a second device;
accessing a contact record associated with the second device in response to receiving or initiating the telephone call;
determining if the contact record associated with the second device includes a note for display during the telephone call with the second device;
determining if the contact record associated with the second device includes an action tag associated with the second device;
if the contact record includes the note, displaying the note on the first mobile device during at least a portion of the telephone call with the second device; and
if the contact record includes the action tag, providing an option to end the incoming call or outgoing call and to dismiss the note from the display.

15. One or more processor readable storage devices according to claim 14, wherein:
the note for display during the call is a first note, the first note including an identifier that the first note should be displayed during the telephone call with the second device;
the contact record includes a second note; and
displaying the first note on the first mobile device includes determining that the first note includes the identifier such that the first note is displayed on the first mobile device and the second note is not displayed on the first mobile device.

16. One or more processor readable storage devices according to claim 15, wherein:
the contact record associated with the second device includes a body field;
the first note and the second note are in the body field;
the identifier is a display tag; and
the second note does not include a display tag.

17. One or more processor readable storage devices according to claim 14, wherein:
receiving or initiating at a first mobile device a telephone call with a second device includes initiating at the first mobile device the telephone call with the second device.

* * * * *